US010435952B2

(12) United States Patent
Mukhopadhyay et al.

(10) Patent No.: US 10,435,952 B2
(45) Date of Patent: Oct. 8, 2019

(54) POLYCRYSTALLINE DIAMOND COMPACT, AND RELATED METHODS AND APPLICATIONS

(71) Applicant: US SYNTHETIC CORPORATION, Orem, UT (US)

(72) Inventors: Debkumar Mukhopadhyay, Sandy, UT (US); Kenneth E. Bertagnolli, Riverton, UT (US); Cody William Knuteson, Salem, UT (US); Kevin Duy Nguyen, Riverton, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 15/910,293

(22) Filed: Mar. 2, 2018

(65) Prior Publication Data

US 2018/0238116 A1 Aug. 23, 2018

Related U.S. Application Data

(62) Division of application No. 14/304,631, filed on Jun. 13, 2014, now Pat. No. 9,945,186.

(51) Int. Cl.
*E21B 10/573* (2006.01)
*B01J 3/06* (2006.01)
(Continued)

(52) U.S. Cl.
CPC ........... *E21B 10/5735* (2013.01); *B01J 3/062* (2013.01); *B24D 3/06* (2013.01); *B24D 18/0009* (2013.01);
(Continued)

(58) Field of Classification Search
CPC .... E21B 10/567; E21B 10/55; E21B 10/5735; B01J 3/062; B24D 3/06; B24D 18/0009;
(Continued)

(56) References Cited

U.S. PATENT DOCUMENTS

| 3,935,034 A | 1/1976 | Hayes |
| 4,224,380 A | 9/1980 | Bovenkerk et al. |

(Continued)

FOREIGN PATENT DOCUMENTS

| CA | 2281546 C | 4/2002 |
| EP | 1079063 A1 | 2/2001 |

(Continued)

OTHER PUBLICATIONS

Final Office Action for U.S. Appl. No. 14/086,283 dated Feb. 3, 2017.
(Continued)

*Primary Examiner* — Yong-Suk Ro
(74) *Attorney, Agent, or Firm* — Dorsey & Whitney LLP

(57) ABSTRACT

Polycrystalline diamond compacts ("PDCs") include a polycrystalline diamond ("PCD") table in which cobalt is alloyed with phosphorous to improve the thermal stability of the PCD table. The PDC includes a substrate and a PCD table including an upper surface spaced from an interfacial surface that is bonded to the substrate. The PCD table includes a plurality of diamond grains defining a plurality of interstitial regions. The PCD table further includes an alloy comprising at least one Group VIII metal and phosphorous. The alloy is disposed in at least a portion of the plurality of interstitial regions.

20 Claims, 12 Drawing Sheets

(51) Int. Cl.

| | |
|---|---|
| *B24D 3/06* | (2006.01) |
| *C04B 35/528* | (2006.01) |
| *C04B 35/645* | (2006.01) |
| *C22C 26/00* | (2006.01) |
| *B24D 18/00* | (2006.01) |
| *E21B 10/55* | (2006.01) |
| *E21B 10/567* | (2006.01) |
| *B24D 99/00* | (2010.01) |
| *B22F 5/00* | (2006.01) |

(52) U.S. Cl.
CPC .......... *B24D 99/005* (2013.01); *C04B 35/528* (2013.01); *C04B 35/645* (2013.01); *C22C 26/00* (2013.01); *E21B 10/55* (2013.01); *E21B 10/567* (2013.01); *B01J 2203/062* (2013.01); *B22F 2005/001* (2013.01); *B22F 2207/03* (2013.01); *C04B 2235/405* (2013.01); *C04B 2235/42* (2013.01); *C04B 2235/427* (2013.01); *C04B 2235/6587* (2013.01); *C04B 2235/661* (2013.01); *C04B 2235/85* (2013.01); *C22C 2204/00* (2013.01)

(58) Field of Classification Search
CPC . B24D 99/005; B24D 3/10; B22F 3/14; B22F 2005/001; B22F 999/00; C04B 35/528; C04B 35/645; C22C 26/00; C22C 29/08
See application file for complete search history.

(56) References Cited

U.S. PATENT DOCUMENTS

| | | | |
|---|---|---|---|
| 4,268,276 A | 5/1981 | Bovenkerk | |
| 4,274,900 A | 6/1981 | Mueller et al. | |
| 4,404,413 A | 9/1983 | Haskell | |
| 4,410,054 A | 10/1983 | Nagel et al. | |
| 4,468,138 A | 8/1984 | Nagel | |
| 4,560,014 A | 12/1985 | Geczy | |
| 4,738,322 A | 4/1988 | Hall et al. | |
| 4,811,801 A | 3/1989 | Salesky et al. | |
| 4,907,377 A | 3/1990 | Csillag et al. | |
| 4,913,247 A | 4/1990 | Jones | |
| 5,016,718 A | 5/1991 | Tandberg | |
| RE33,767 E | 12/1991 | Christini et al. | |
| 5,092,687 A | 3/1992 | Hall | |
| 5,120,327 A | 6/1992 | Dennis | |
| 5,127,923 A | 7/1992 | Bunting et al. | |
| 5,135,061 A | 8/1992 | Newton, Jr. | |
| 5,154,245 A | 10/1992 | Waldenstrom et al. | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,544,713 A | 8/1996 | Dennis | |
| 5,759,216 A | 6/1998 | Kanada et al. | |
| 6,261,329 B1 | 7/2001 | Ogata et al. | |
| 6,338,754 B1 | 1/2002 | Cannon et al. | |
| 6,541,115 B2 | 4/2003 | Pender et al. | |
| 6,793,681 B1 | 9/2004 | Pope et al. | |
| 7,353,893 B1 | 4/2008 | Hall et al. | |
| 7,473,287 B2 | 1/2009 | Belnap et al. | |
| 7,635,035 B1 | 12/2009 | Bertagnolli et al. | |
| 7,647,993 B2 | 1/2010 | Middlemiss | |
| 7,726,421 B2 | 6/2010 | Middlemiss | |
| 7,866,418 B2 | 1/2011 | Bertagnolli et al. | |
| 7,950,477 B1 | 5/2011 | Bertagnolli et al. | |
| 7,998,573 B2 | 8/2011 | Qian et al. | |
| 8,034,136 B2 | 10/2011 | Sani | |
| 8,069,935 B1 | 12/2011 | Miess et al. | |
| 8,080,071 B1 | 12/2011 | Vail | |
| 8,109,349 B2 | 2/2012 | Hall et al. | |
| 8,236,074 B1 | 8/2012 | Bertagnolli et al. | |
| 8,277,722 B2 | 10/2012 | DiGiovanni | |
| 8,727,045 B1 | 5/2014 | Mukhopadhyay et al. | |
| 8,764,864 B1 | 7/2014 | Miess et al. | |
| 8,820,442 B2 | 9/2014 | Gonzalez et al. | |
| 9,610,555 B2 | 4/2017 | Mukhopadhyay et al. | |
| 9,945,186 B2* | 4/2018 | Mukhopadhyay | .. E21B 10/5735 |
| 2008/0115421 A1 | 5/2008 | Sani | |
| 2008/0219914 A1 | 9/2008 | Smallman et al. | |
| 2010/0084196 A1* | 4/2010 | Bertagnolli | ............. C22C 26/00 175/428 |
| 2011/0030283 A1 | 2/2011 | Cariveau et al. | |
| 2011/0067929 A1* | 3/2011 | Mukhopadhyay | ....... B01J 3/062 175/432 |
| 2011/0083908 A1 | 4/2011 | Shen et al. | |
| 2012/0012401 A1 | 1/2012 | Gonzalez et al. | |
| 2012/0012402 A1 | 1/2012 | Thigpen et al. | |
| 2012/0047814 A1 | 3/2012 | Mukhopadhyay et al. | |
| 2012/0152622 A1 | 6/2012 | Sue et al. | |
| 2012/0241226 A1 | 9/2012 | Bertagnolli et al. | |
| 2012/0261197 A1 | 10/2012 | Miess et al. | |
| 2012/0324801 A1 | 12/2012 | Fang | |
| 2012/0325565 A1 | 12/2012 | Fang | |
| 2013/0067826 A1 | 3/2013 | Vaughn et al. | |
| 2013/0068540 A1 | 3/2013 | DiGiovanni | |
| 2013/0068541 A1 | 3/2013 | DiGiovanni | |
| 2013/0092451 A1 | 4/2013 | Mukhopadhyay et al. | |
| 2013/0092452 A1 | 4/2013 | Mukhopadhyay et al. | |
| 2013/0180181 A1 | 7/2013 | Nixon et al. | |
| 2014/0047776 A1 | 2/2014 | Scott et al. | |
| 2014/0283457 A1 | 9/2014 | Cariveau et al. | |
| 2014/0318027 A1 | 10/2014 | Sani et al. | |
| 2015/0209745 A1 | 7/2015 | Mukhopadhyay et al. | |
| 2015/0209937 A1 | 7/2015 | Mukhopadhyay et al. | |
| 2015/0211306 A1 | 7/2015 | Mukhopayhyay et al. | |

FOREIGN PATENT DOCUMENTS

| | | |
|---|---|---|
| EP | 1149937 B1 | 4/2009 |
| GB | 376467 | 7/1932 |
| GB | 1496106 | 12/1977 |
| JP | H09254042 A | 9/1997 |
| WO | 2008062369 A2 | 5/2008 |
| WO | 2008/074010 A1 | 6/2008 |
| WO | 2012139060 A1 | 10/2012 |
| WO | 2012173893 A1 | 12/2012 |
| WO | 2013059063 A2 | 4/2013 |
| WO | 2013/092370 A1 | 6/2013 |
| WO | 2015076933 A1 | 5/2015 |
| WO | 2015191578 A2 | 12/2015 |

OTHER PUBLICATIONS

International Search Report and Written Opinion from International Application No. PCT/US2014/058121 dated Mar. 31, 2015.
International Search Report and Written Opinion from International Application No. PCT/US2015034900 dated Dec. 10, 2015.
International Search Report and Written Opinion from International Application No. PCT/US2016/025586 dated Jul. 12, 2016.
Issue Notification for U.S. Appl. No. 14/062,283 dated Aug. 30, 2017.
Issue Notification for U.S. Appl. No. 14/677,821 dated Jul. 12, 2017.
Issue Notification for U.S. Appl. No. 14/677,859 dated Mar. 15, 2017.
Non-Final Office Action for U.S. Appl. No. 14/086,283 dated Aug. 24, 2016.
Non-Final Office Action for U.S. Appl. No. 14/304,631 dated Mar. 23, 2017.
Non-Final Office Action for U.S. Appl. No. 14/677,821 dated Sep. 23, 2016.
Non-Final Office Action for U.S. Appl. No. 14/677,875 dated Sep. 25, 2017.
Non-Final Office Action for U.S. Appl. No. 15/442,237 dated Nov. 8, 2017.
Notice of Allowance for U.S. Appl. No. 14/086,283 dated May 24, 2017.
Notice of Allowance for U.S. Appl. No. 14/304,631 dated Aug. 9, 2017.

(56) References Cited

OTHER PUBLICATIONS

Notice of Allowance for U.S. Appl. No. 14/677,821 dated Mar. 27, 2017.
Notice of Allowance for U.S. Appl. No. 14/677,859 dated Aug. 3, 2016.
Notice of Allowance for U.S. Appl. No. 14/677,859 dated Nov. 21, 2016.
Notice of Allowance of U.S. Appl. No. 14/304,631 dated Dec. 5, 2017.
Partial International Search Report from International Application No. PCT/US2015/034900 dated Sep. 29, 2015.
Restriction Requirement for U.S. Appl. No. 14/086,283 dated Apr. 15, 2016.
Restriction Requirement for U.S. Appl. No. 14/304,631 dated Nov. 17, 2016.
Supplemental Notice of Allowance for U.S. Appl. No. 14/677,821 dated Apr. 14, 2017.
Supplemental Notice of Allowance for U.S. Appl. No. 14/677,821 dated Apr. 27, 2017.
U.S. Appl. No. 14/677,821, filed Apr. 2, 2015.
U.S. Appl. No. 14/677,859, filed Apr. 2, 2015.
U.S. Appl. No. 14/677,875, filed Apr. 2, 2015.
U.S. Appl. No. 13/751,405, filed Jan. 28, 2013.
U.S. Appl. No. 14/086,283, filed Nov. 21, 2013.
U.S. Appl. No. 12/555,715, filed Sep. 9, 2008.
U.S. Appl. No. 13/275,372, filed Oct. 18, 2011.
U.S. Appl. No. 14/304,631, filed Jun. 13, 2014.
Ahmed, Waqar et al., "Chemical Vapor Deposition of Diamond Coatings onto Dental Burrs", Journal of Chemical Education, vol. 80 No. 6, Jun. 2003, pp. 636-641.
Cremer, R. et al., "Formation of Intermetallic CObalt Phases in teh Near Surface Region of Cemented Carbides for Improved Diamond Layer Deposition", Thin Solid Films 355-356, 1999, pp. 127-133.
Decker, D.L. et al., "High-Pressure Calibration: A Critical Review", J. Phys. Chem. Ref. Data, vol. 1, No. 3, 1972, pp. 1, 3.
Guobiao, Lin et al., "Boronizing Mechanism of Cemented Carbides and Their Wear Resistance", Int. Journal of Refractory Metals and Hard Materials, 41, 2013, pp. 351-355.
Ishida, K. et al., "The Co—P (Cobalt-Phosphorus) System", Bulletin of Alloy Phase Diagrams, ASM International, vol. 11, No. 6, Dec. 1, 1990, pp. 555-559.
Rousse, G. et al., "Structure of the Intermediate Phase of PbTe at High Pressue", Physical Review B: Condensed Matter and Materials Physics, 71, 2005, pp. 224116.
Issue Notification for U.S. Appl. No. 14/304,631 dated Mar. 28, 2018.
Issue Notification for U.S. Appl. No. 14/677,875 dated Jul. 25, 2018.
Issue Notification for U.S. Appl. No. 15/442,237 dated Jun. 27, 2018.
Notice of Allowance for U.S. Appl. No. 14/677,875 dated Apr. 17, 2018.
Notice of Allowance for U.S. Appl. No. 15/442,237 dated Mar. 21, 2018.
Notice of Allowance for U.S. Appl. No. 15/683,614 dated May 23, 2019.
Restriction Requirement for U.S. Appl. No. 16/034,020 dated Jul. 15, 2019.

* cited by examiner

POLYCRYSTALLINE DIAMOND COMPACT, AND RELATED METHODS AND APPLICATIONS

CROSS-REFERENCE TO RELATED APPLICATION

This application is a division of U.S. application Ser. No. 14/304,631 filed on Jun. 13, 2014, the disclosure of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned on a surface of the cemented carbide substrate. A number of such containers may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in formation of a matrix of bonded diamond grains having diamond-to-diamond bonding therebetween. Interstitial regions between the bonded diamond grains are occupied by the metal-solvent catalyst.

Despite the availability of a number of different PDCs, manufacturers and users of PDCs continue to seek PDCs with improved mechanical properties.

SUMMARY

Embodiments of the invention relate to PDCs including a PCD table in which at least one Group VIII metal (e.g., cobalt) is alloyed with phosphorous to improve the thermal stability and/or wear resistance of the PCD table. In an embodiment, a PDC includes a substrate and a PCD table including an upper surface spaced from an interfacial surface that is bonded to the substrate. The PCD table includes a plurality of diamond grains defining a plurality of interstitial regions. The PCD table further includes an alloy comprising at least one Group VIII metal and phosphorous. The alloy is disposed in at least a portion of the plurality of interstitial regions.

In an embodiment, a method of fabricating a PDC is disclosed. The method includes providing an assembly having a PCD table bonded to a substrate, and at least one material positioned adjacent to the PCD table. The PCD table includes a plurality of bonded diamond grains defining a plurality of interstitial regions, with at least a portion of the plurality of interstitial regions including at least one Group VIII metal disposed therein. The at least one material includes phosphorous. The method further includes subjecting the assembly to an HPHT process at a first process condition effective to alloy at least some of the at least one Group VIII metal with the phosphorous.

Other embodiments include applications utilizing the disclosed PDCs in various articles and apparatuses, such as rotary drill bits, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to PDCs including a PCD table in which at least one Group VIII metal is alloyed with phosphorous to improve the thermal stability and/or wear resistance of the PCD table. The disclosed PDCs may be used in a variety of applications, such as rotary drill bits, machining equipment, and other articles and apparatuses.

Figure 1A:
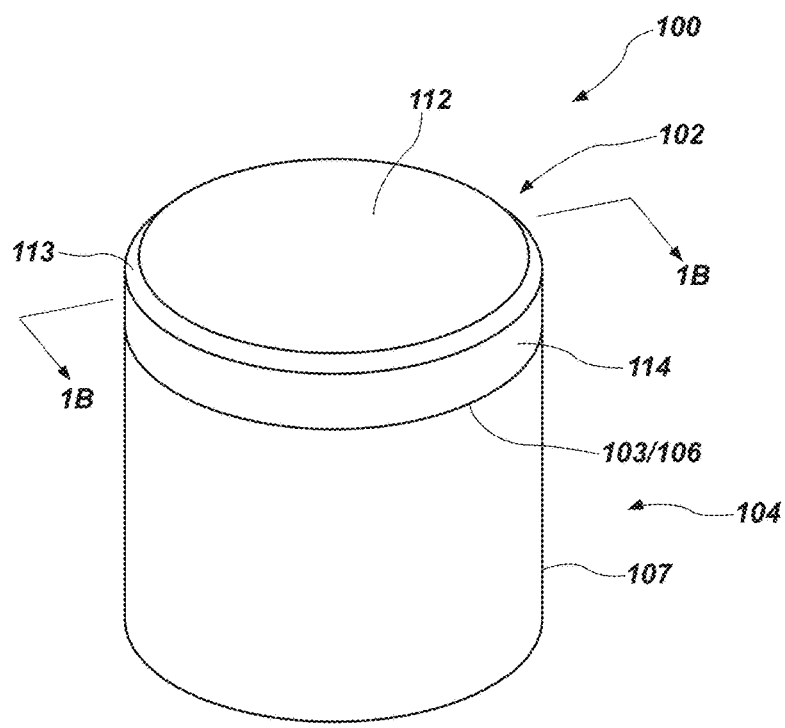
FIG. 1A is an isometric view of an embodiment of a PDC.
Figure 1B:
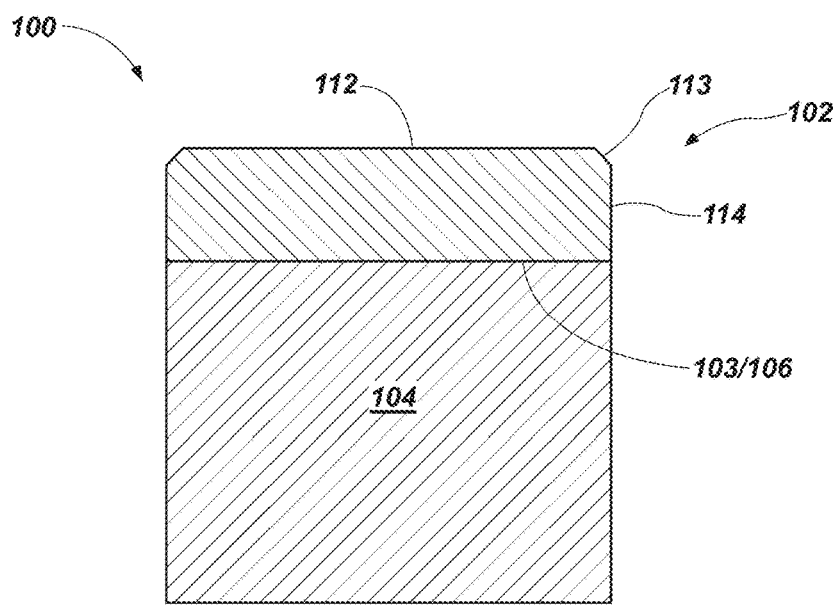
FIG. 1B is a cross-sectional view of the PDC shown in FIG. 1A taken along line 1B-1B thereof.

FIGS. 1A and 1B are isometric and cross-sectional views, respectively, of an embodiment of a PDC 100. The PDC 100 includes a PCD table 102 having an interfacial surface 103, and a substrate 104 having an interfacial surface 106 that is bonded to the interfacial surface 103 of the PCD table 102. The substrate 104 may comprise, for example, a cemented carbide substrate, such as tungsten carbide, tantalum carbide, vanadium carbide, niobium carbide, chromium carbide, titanium carbide, or combinations of the foregoing carbides cemented with iron, nickel, cobalt, or alloys thereof. In an embodiment, the cemented carbide substrate comprises a cobalt-cemented tungsten carbide substrate. While the PDC 100 is illustrated as being generally cylindrical, the PDC 100 may exhibit any other suitable geometry and may be non-cylindrical. Additionally, while the interfacial surfaces 103 and 106 are illustrated as being substantially planar, the interfacial surfaces 103 and 106 may exhibit complementary non-planar configurations.

The PCD table 102 may be integrally formed with the substrate 104. For example, the PCD table 102 may be integrally formed with the substrate 104 in an HPHT process by sintering of diamond particles on the substrate 104. The PCD table 102 further includes a plurality of directly bonded-together diamond grains exhibiting diamond-to-diamond bonding (e.g., $sp^3$ bonding) therebetween. The plurality of directly bonded-together diamond grains define a plurality of interstitial regions. For example, the diamond grains of the PCD table 102 may exhibit an average grain size of about less than 40 μm, about less than 30 μm, about 18 μm to about 30 μm, or about 18 μm to about 25 μm (e.g., about 19 μm to about 21 μm). The PCD table 102 defines the working upper surface 112, at least one side surface 114, and an optional peripherally-extending chamfer 113 that extends between the at least one side surface 114 and the working upper surface 112.

A metallic interstitial constituent is disposed in at least a portion of the interstitial regions of the PCD table 102. In an embodiment, the metallic interstitial constituent includes and/or is formed from an alloy that is chosen to exhibit a selected melting temperature or melting temperature range and bulk modulus that are sufficiently low so that it does not break diamond-to-diamond bonds between bonded diamond grains during heating experienced during use, such as cutting operations. For example, the alloy may exhibit a bulk modulus that is less than that of the at least one Group VIII metal in substantially pure form. During cutting operations using the PCD table 102, the relatively deformable metallic interstitial constituent may potentially extrude out of the PCD table 102. However, before, during, and after the cutting operations, the PCD table 102 still includes the metallic interstitial constituent distributed substantially entirely throughout the PCD table 102.

According to various embodiments, the alloy comprises at least one Group VIII metal including cobalt, iron, nickel, or alloys thereof; phosphorous; and optionally other constituents. The phosphorous may be present in the at least one Group VIII metal in an amount of about greater than 0 to about 40 atomic %, about 5 atomic % to about 35 atomic %, about 15 atomic % to about 35 atomic %, about 20 atomic % to about 35 atomic %, about 5 atomic % to about 15 atomic %, or about 30 weight % to about 35 weight % of the alloy. In some embodiments, the phosphorous may be present with the at least one Group VIII metal in an amount at a eutectic composition, hypo-eutectic composition, or hyper-eutectic composition for the at least one Group VIII-phosphorous chemical system if the at least one Group VIII-phosphorous has a eutectic composition. The phosphorous may lower a melting temperature of the at least one Group VIII metal, a bulk modulus of the at least one Group VIII metal, a coefficient of thermal expansion of the at least one Group VIII metal, or any combination thereof.

The at least one Group VIII metal may be infiltrated from the cementing constituent of the substrate 104 (e.g., cobalt from a cobalt-cemented tungsten carbide substrate) and alloyed with the phosphorous provided from a source other than the substrate 104, such as phosphorous being alloyed with the at least one Group VII metal and mixed with the diamond particles, phosphorous powder being mixed with diamond particles prior to HPHT processing, phosphorous being diffused into the at least one Group VIII metal after it has infiltrated the diamond particles used to form the diamond grains, or combinations thereof. In such an embodiment, a depletion region of the at least one Group VIII metal in the substrate 104 in which the concentration of the at least one Group VIII metal is less than the concentration prior to being bonded to the PCD table 102 may be present at and near the interfacial surface 106. In such an embodiment, the at least one Group VIII metal may form and/or carry tungsten and/or tungsten carbide with it during infiltration into the diamond particles being sintered that, ultimately, forms the PCD table 102.

Depending on the alloy system, in some embodiments, the alloy disposed interstitially in the PCD table 102 comprises one or more solid solution alloy phases of the at least one Group VIII metal and the phosphorous, one or more intermediate compound phases (e.g., one or more intermetallic compounds) between the phosphorous and the at least one Group VIII metal and/or other metal (e.g., tungsten) to form one or more binary or greater intermediate compound phases, elemental phosphorous, carbon, optionally other metal(s), or combinations thereof. In some embodiments, when the one or more intermediate compounds are present in the alloy, the one or more intermediate compounds are present in an amount less than about 15 weight % of the alloy, such as less than about 10 weight %, about 5 weight % to about 10 weight %, about 1 weight % to about 4 weight %, or about 1 weight % to about 3 weight %, with the balance being the one or more solid solution phases and/or one or more carbide phases. In other embodiments, when the one or more intermediate compounds are present in the alloy, the one or more intermediate compounds are present in the alloy in an amount greater than about 90 weight % of the alloy, such as about 90 weight % to about 100 weight %, about 90 weight % to about 95 weight %, about 90 weight % to about 97 weight %, about 92 weight % to about 95 weight %, about 97 weight % to about 99 weight %, or about 100 weight % (i.e., substantially all of the alloy). That is, in some embodiments, the alloy may be a multi-phase alloy that may include one or more solid solution alloy phases, one or more intermediate compound phases, one or more carbide phases, or combinations thereof. The inventors currently believe that the presence of the one or more intermediate compounds may enhance the thermal stability of the PCD table 102 due to the relatively lower coefficient of thermal expansion of the one or more intermediate compounds compared to a pure Group VIII metal, such as cobalt. Additionally, in some embodiments, the inventors currently believe that the presence of the solid solution alloy of the at least one Group VIII metal may enhance the thermal stability of the PCD table 102 due to lowering of the melting temperature and/or bulk modulus of the at least one Group VIII metal.

For example, when the at least one Group VIII element is cobalt and the substrate 104 is a cobalt-cemented tungsten carbide substrate, the alloy may include a WC phase, a $Co_2P$ cobalt-phosphorous intermetallic compound phase, a Co phase (e.g., substantially pure cobalt or a cobalt solid solution phase), and optionally elemental phosphorous in various amounts or no elemental phosphorous. In such an embodiment, the phosphorous may be present with the cobalt in an amount of about 30 atomic % to about 34 atomic % of the alloy and, more specifically, about 33.33 atomic % of the alloy. According to one or more embodiments, the WC phase may be present in the alloy in an amount less than 1 weight %, or less than 3 weight %; the $Co_2P$ cobalt-phosphorous intermetallic compound phase may be present in the alloy in an amount greater than 80 weight %, about 80 weight % to about 95 weight %, more than 90 weight %, about 85 weight % to about 95 weight %, or about 95 weight % to about 99 weight %; and the Co phase (e.g., substantially pure cobalt or a cobalt solid solution phase) may be present in the alloy in an amount less than 1 weight %, or less than 3 weight %. Any combination of the recited concentrations for the foregoing phases may be present in the alloy.

Depending on the HPHT processing technique used to form the PDC 100, the alloy disposed in the interstitial regions of the PCD table 102 may exhibit a composition that is substantially uniform throughout the PCD table 102. This may occur when the phosphorous is provided by mixing phosphorous powder with diamond particles prior to HPHT processing. In other embodiments, the composition of the alloy disposed in the interstitial regions of the PCD table 102 may exhibit a gradient (e.g., a substantially continuous gradient) in which the concentration of the phosphorous decreases with distance away from the working upper surface 112 of the PCD table 102 toward the substrate 104. In such an embodiment, if present at all, the alloy may exhibit a decreasing concentration of any intermediate compounds with distance away from the working upper surface 112 of the PCD table 102.

Figure 1C:
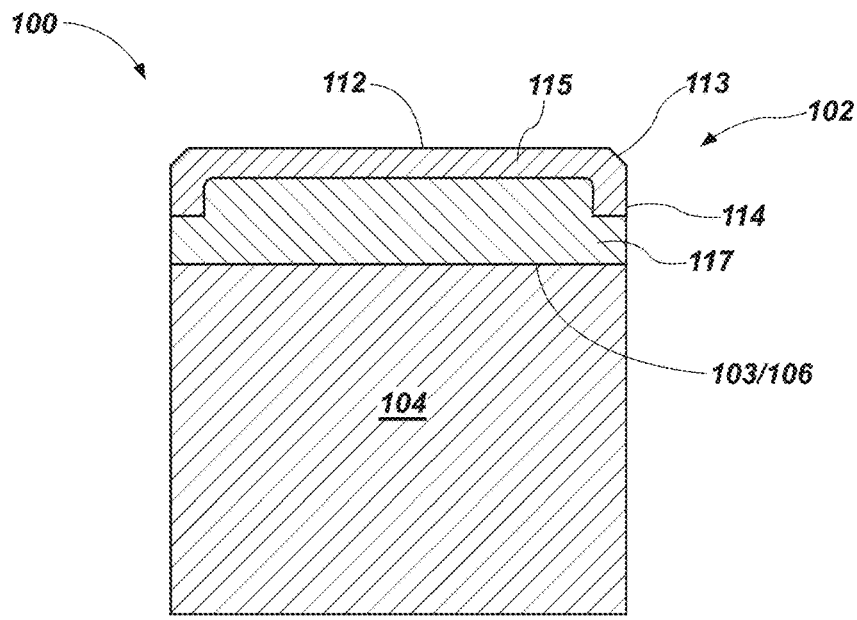
FIGS. 1C and 1D are cross-sectional views of the PDC shown in FIG. 1A taken along line 1B-1B thereof, each of which exhibits a different geometry for the region treated with phosphorous.

The depth to which the phosphorous is present in the PCD table 102 may depend upon one or more the temperature of the HPHT process, the type of phosphorous used in the HPHT processing, the technique used to introduce the phosphorous to the PCD table 102, or the amount of phosphorous used in the manufacture of the PCD table 102. For example, the depth at which the phosphorous is present in the alloy of the PCD table 102 as $Co_2P$ as measured from the upper surface 112 may be at least 250 μm, at least about 250 μm, about 400 μm to about 700 μm, or about 600 μm to about 800 μm. When the at least one Group VIII metal is cobalt, the inventors currently believe that the depth of phosphorous diffusion should be sufficient so that $Co_2P$ forms at a depth of at least about 250 μm as measured from the upper surface 112 to improve thermal stability and/or wear resistance relative to a PCD table that does not contain appreciable amounts of phosphorous. Referring to FIG. 1C, in such an embodiment in which the phosphorous is diffused into the PCD table from an outside surface thereof, two distinct regions of the PCD table 102 may be formed: a first region 115 extending inwardly from the upper surface 112 and generally contouring the chamfer 113 in which the alloy consists essentially of $Co_2P$ in the interstitial regions and a second region 117 adjacent to the substrate 104, with the second region 117 being substantially free of $Co_2P$ in which the interstitial regions thereof include cobalt in elemental and/or solid solution form with phosphorous and/or elemental phosphorous. In the case in which the at least one Group VIII metal is iron, the alloy of the first region 115 consists essentially of $Fe_3P$ and/or $Fe_2P$ in the interstitial regions and the second region 117 adjacent to the substrate 104, with the second region 117 being substantially free of $Fe_3P$ and/or $Fe_2P$ in which the interstitial regions thereof include iron in elemental and/or solid solution form with phosphorous and/or elemental phosphorous in the interstitial regions. In the case in which the at least one Group VIII metal is nickel, the alloy of the first region 115 consists essentially of $Ni_3P$ and/or $Ni_5P_2$ in the interstitial regions and the second region 117 adjacent to the substrate 104, with the second region 117 being substantially free of $Ni_3P$ and/or $Ni_5P_2$ in which the interstitial regions thereof include nickel in elemental and/or solid solution form with phosphorous and/or elemental phosphorous in the interstitial regions.

Figure 1D:
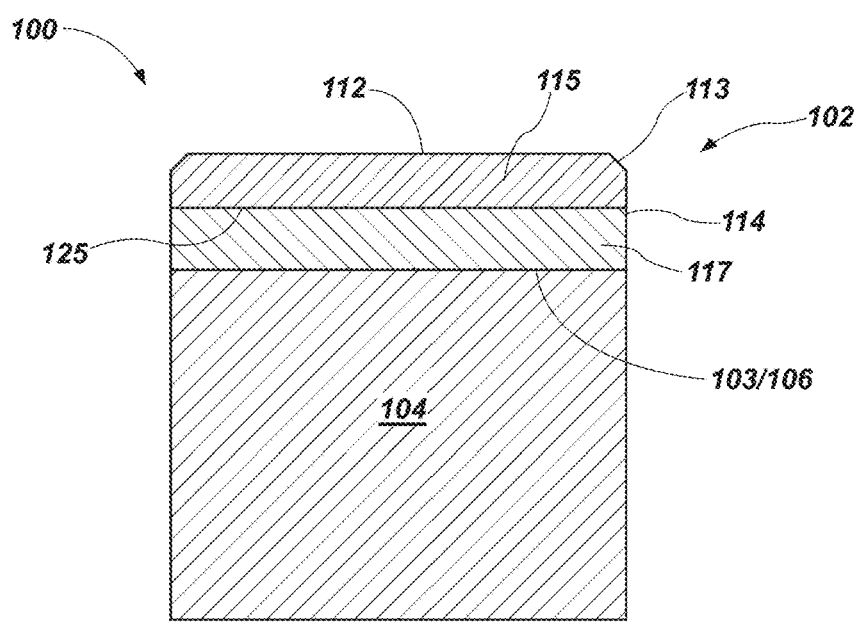

FIG. 1D illustrates another embodiment in which the first region 115 exhibits a different configuration than that shown in FIG. 1B. The geometry of the first region 115 may define a substantially horizontal boundary 125 between the first region 115 and the underlying second region 117. In the illustrated embodiment, the substantially horizontal boundary 125 is located below the chamfer 113. However, in other embodiments, the substantially horizontal boundary 125 may be located substantially at the bottom of the chamfer 113.

It should be noted that when the phosphorous is mixed with the diamond particle used to form the PCD table (either in a powder form and/or pre-alloyed with the Group VIII metal in powder form), the alloy may be substantially homogenous and the concentration of phosphorous may be substantially uniform throughout the PCD table 102. For example, in such an embodiment, the alloy may include almost entirely $Co_2P$ when the at least one Group VIII metal is cobalt, the alloy may include almost entirely $Fe_3P$ and/or $Fe_2P$ when the at least one Group VIII metal is iron, or the alloy may include almost entirely $Ni_3P$ and/or $Ni_5P_2$ when the at least one Group VIII metal is nickel.

The alloy of the PCD table 102 may be selected from a number of different alloys exhibiting a melting temperature of about 1400° C. or less and a bulk modulus at 20° C. of about 150 GPa or less. As used herein, melting temperature refers to the lowest temperature at which melting of a material begins at standard pressure conditions (i.e., 100 kPa). For example, depending upon the composition of the alloy, the alloy may melt over a temperature range such as occurs when the alloy has a hypereutectic composition or a hypoeutectic composition where melting begins at the solidus temperature and is substantially complete at the liquidus temperature. In other cases, the alloy may have a single melting temperature as occurs in a substantially pure metal or a eutectic alloy.

In one or more embodiments, the alloy exhibits a coefficient of thermal expansion of about $3 \times 10^{-6}$ per ° C. to about $20 \times 10^{-6}$ per ° C., a melting temperature of about 180° C. to about 1300° C., and a bulk modulus at 20° C. of about 30 GPa to about 150 GPa; a coefficient of thermal expansion of about $15 \times 10^{-6}$ per ° C. to about $20 \times 10^{-6}$ per ° C., a melting temperature of about 180° C. to about 1100° C., and a bulk modulus at 20° C. of about 50 GPa to about 130 GPa; a coefficient of thermal expansion of about $15 \times 10^{-6}$ per ° C. to about $20 \times 10^{-6}$ per ° C., a melting temperature of about 950° C. to about 1100° C. (e.g., 1090° C.), and a bulk modulus at 20° C. of about 120 GPa to about 140 GPa (e.g., about 130 GPa); or a coefficient of thermal expansion of about $15 \times 10^{-6}$ per ° C. to about $20 \times 10^{-6}$ per ° C., a melting temperature of about 180° C. to about 300° C. (e.g., about 250° C.), and a bulk modulus at 20° C. of about 45 GPa to about 55 GPa (e.g., about 50 GPa). For example, the alloy may exhibit a melting temperature of less than about 1200° C. (e.g., less than about 1100° C.) and a bulk modulus at 20° C. of less than about 140 GPa (e.g., less than about 130 GPa). For example, the alloy may exhibit a melting temperature of less than about 1200° C. (e.g., less than 1100° C.), and a bulk modulus at 20° C. of less than about 130 GPa.

When the HPHT sintering pressure is greater than about 7.5 GPa cell pressure, optionally in combination with the average diamond grain size being less than about 30 μm, any portion of the PCD table 102 (prior to being leached) defined collectively by the bonded diamond grains and the alloy may exhibit a coercivity of about 115 Oe or more and the alloy content in the PCD table 102 may be less than about 7.5% by weight as indicated by a specific magnetic saturation of about 15 G·cm$^3$/g or less. In another embodiment, the coercivity may be about 115 Oe to about 250 Oe and the specific magnetic saturation of the PCD table 102 (prior to being leached) may be greater than 0 G·cm$^3$/g to about 15 G·cm$^3$/g. In another embodiment, the coercivity may be about 115 Oe to about 175 Oe and the specific magnetic saturation of the PCD may be about 5 G·cm$^3$/g to about 15 G·cm$^3$/g. In yet another embodiment, the coercivity of the PCD table (prior to being leached) may be about 155 Oe to about 175 Oe and the specific magnetic saturation of the first region 114 may be about 10 G·cm$^3$/g to about 15 G·cm$^3$/g. The specific permeability (i.e., the ratio of specific magnetic saturation to coercivity) of the PCD table 102 may be about 0.10 G·cm$^3$/g·Oe or less, such as about 0.060 G·cm$^3$/g·Oe to about 0.090 G·cm$^3$/g·Oe. In some embodiments, the average grain size of the bonded diamond grains may be less than about 30 μm and the alloy content in the PCD table 102 (prior to being leached) may be less than about 7.5% by weight (e.g., about 1% to about 6% by weight, about 3% to about 6% by weight, or about 1% to about 3% by weight). Additionally details about magnetic properties that the PCD table 102 may exhibit is disclosed in U.S. Pat. No. 7,866,418, the disclosure of which is incorporated herein, in its entirety, by this reference.

In some embodiments in which the at least one Group VIII metal is cobalt and the PCD table 102 is unleached, the PDC 100 may exhibit a thermal stability characterized by a distance that it may cut in a mill test prior to failure of at least about 155 inches, such as 155 inches to about 300 inches, 160 inches to about 170 inches, about 170 inches to about 220 inches, about 190 inches to about 240 inches, about 220 inches to about 260 inches, or about 250 inches to about 290 inches. The thermal stability may be evaluated in a mill test in which the PDC is used to cut a Barre granite workpiece without any coolant (i.e., dry cutting of the Barre granite workpiece in air). The test parameters used for the mill test may be a back rake angle for the PDC of about 20°, an in-feed for the PDC of about 50.8 cm/min, a width of cut for the PDC of about 7.62 cm, a depth of cut for the PDC of about 0.762 mm, a rotary speed of the workpiece to be cut of about 3000 RPM, and an indexing in the Y direction across the workpiece of about 7.62 cm and about 20 seconds between cutting passes with the PDC on the Barre granite workpiece. The PDC may be held in a cutting tool holder, with the substrate of the PDC tested thermally insulated on its back side via an alumina disk and along its circumference by a plurality of zirconia pins. Failure is considered when the PDC can no longer cut the workpiece.

Figure 2:
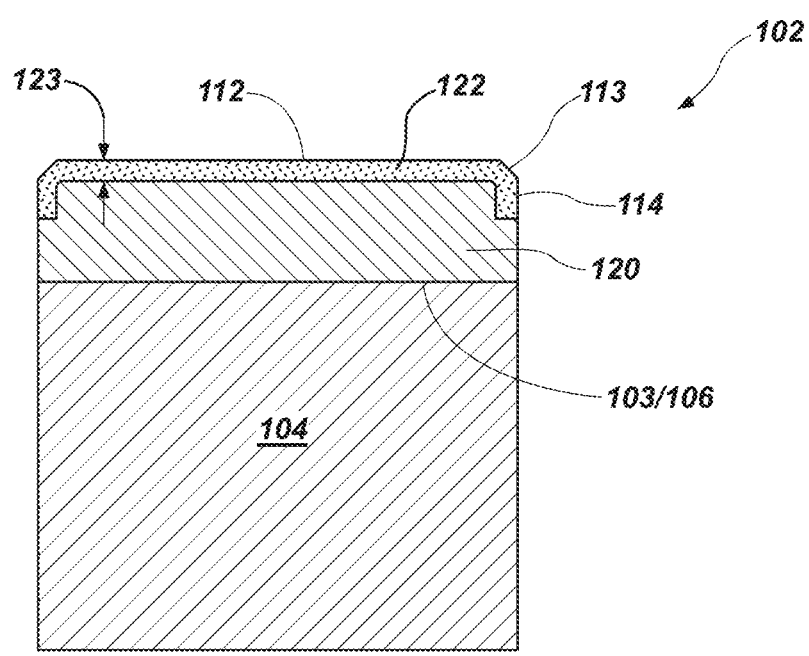
FIG. 2 is a cross-sectional view of another embodiment in which the PCD table shown in FIGS. 1A and 1B is leached to deplete the metallic interstitial constituent from a leached region thereof.

Referring specifically to the cross-sectional view of FIG. 2, in an embodiment, the PCD table 102 may be leached to improve the thermal stability thereof. The PCD table 102 includes a first region 120 adjacent to the interfacial surface 106 of the substrate 104. The metallic interstitial constituent occupies at least a portion of the interstitial regions of the first region 120 of the PCD table 102. For example, the metallic interstitial constituent may be any of the alloys disclosed herein. The PCD table 102 also includes a leached second region 122 remote from the substrate 104 that includes the upper surface 112, the chamfer 113, and a portion of the at least one side surface 114. The leached second region 122 extends inwardly to a selected depth or depths from the upper surface 112, the chamfer 113, and a portion of the at least one side surface 114.

The leached second region 122 has been leached to deplete the metallic interstitial constituent therefrom that previously occupied the interstitial regions between the bonded diamond grains of the leached second region 122. The leaching may be performed in a suitable acid (e.g., aqua regia, nitric acid, hydrofluoric acid, or combinations thereof) so that the leached second region 122 is substantially free of the metallic interstitial constituent. As a result of the metallic interstitial constituent (e.g., a cobalt-phosphorous alloy) being depleted from the leached second region 122, the leached second region 122 may be relatively more thermally stable than the underlying first region 120.

Generally, a maximum leach depth 123 may be greater than 250 μm. For example, the maximum leach depth 123 for the leached second region 122 may be about 300 μm to about 425 μm, about 250 μm to about 400 μm, about 350 μm to about 400 μm, about 350 μm to about 375 μm, about 375 μm to about 400 μm, or about 500 μm to about 650 μm. The maximum leach depth 123 may be measured inwardly from at least one of the upper surface 112, the chamfer 113, or the at least one side surface 114.

Figure 3A:
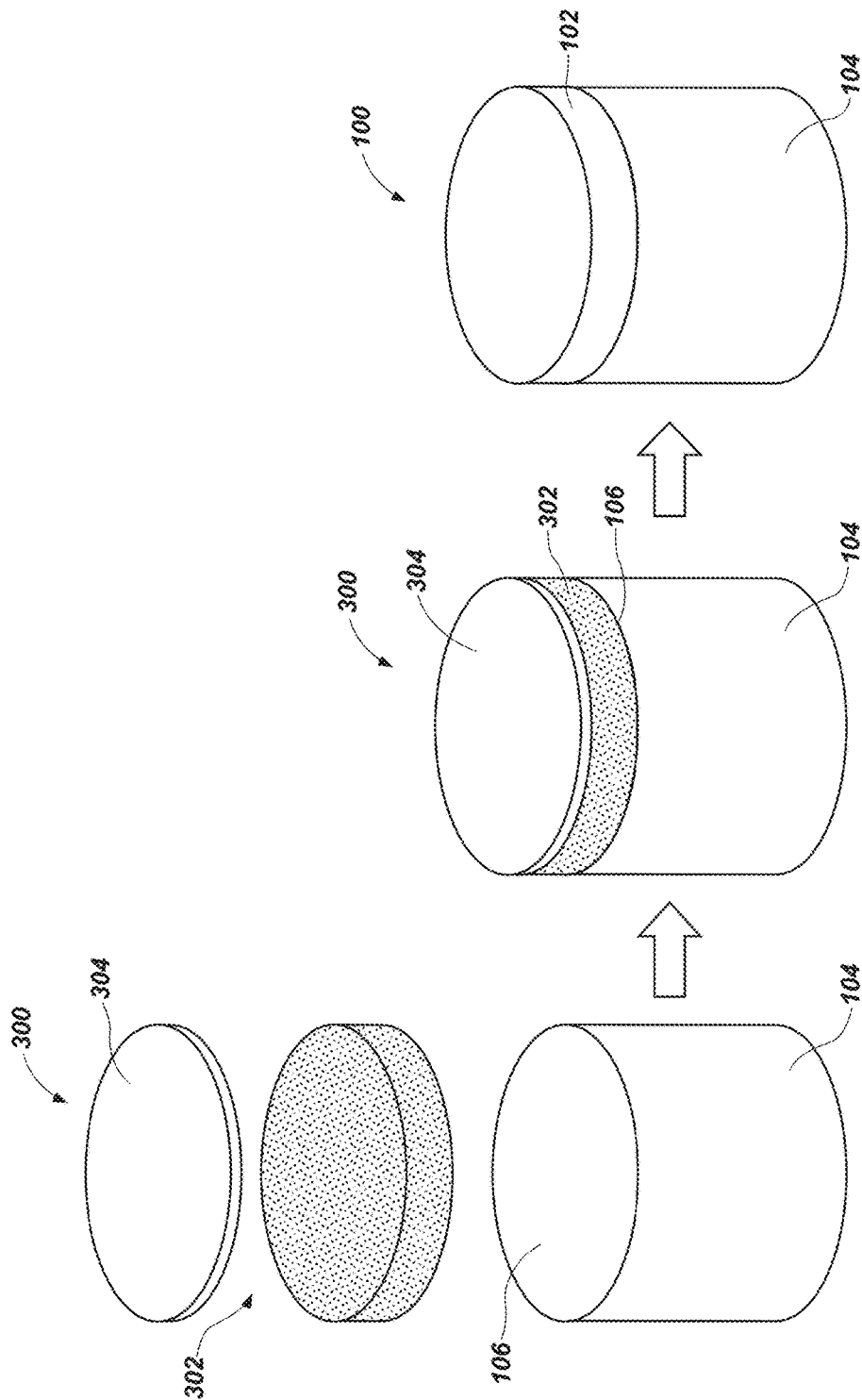
FIG. 3A is a schematic diagram at different stages during the fabrication of the PDC shown in FIGS. 1A and 1B according to an embodiment of a method.

FIG. 3A is a schematic diagram at different stages during the fabrication of the PDC 100 shown in FIGS. 1A and 1B according to an embodiment of a method. Referring to FIG. 3A, an assembly 300 including a mass of diamond particles 302 is positioned between the interfacial surface 106 of the substrate 104 and at least one material 304 that includes phosphorous. For example, the at least one material 304 may be in the form of particles of phosphorous, a thin disc of phosphorous, a green body of particles of phosphorous, an alloy of the Group VIII metal and phosphorous in disk or powder form, or combinations thereof. For example, the phosphorous may be in the form of any form phosphorous, such as white phosphorus, red phosphorous, violet phosphorous, black phosphorous, or combinations thereof. Any of the types of phosphorous forms may be in amorphous or crystalline form. As previously discussed, the substrate 104 may include a metal-solvent catalyst as a cementing constituent comprising at least one Group VIII metal, such as cobalt, iron, nickel, or alloys thereof. For example, the substrate 104 may comprise a cobalt-cemented tungsten carbide substrate in which cobalt is the at least one Group VIII metal that serves as the cementing constituent.

The diamond particles may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). In various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In an embodiment, the plurality of diamond particles may include a portion exhibiting a relatively larger size between about 40 µm and about 15 µm and another portion exhibiting a relatively smaller size between about 12 µm and 2 µm. Of course, the diamond particles may also include three or more different sizes (e.g., one relatively larger size and two or more relatively smaller sizes), without limitation.

The assembly 300 may be placed in a pressure transmitting medium, such as a refractory metal can embedded in pyrophyllite or other pressure transmitting medium, and subjected to a first stage HPHT process. For example, the first stage HPHT process may be performed using an ultra-high pressure press to create temperature and pressure conditions at which diamond is stable. The temperature of the first stage HPHT process may be at least about 1000° C. (e.g., about 1200° C. to about 1600° C.) and the pressure of the HPHT process may be at least 4.0 GPa (e.g., about 5.0 GPa to about 12 GPa or about 7.5 GPa to about 11 GPa) for a time sufficient to sinter the diamond particles to form a PCD table. For example, the pressure of the first stage HPHT process may be about 7.5 GPa to about 10 GPa and the temperature of the HPHT process may be about 1150° C. to about 1450° C. (e.g., about 1200° C. to about 1400° C.). The foregoing pressure values employed in the HPHT process refer to the cell pressure in the pressure transmitting medium that transfers the pressure from the ultra-high pressure press to the assembly.

In an embodiment, during the first stage HPHT process, the at least one Group VIII metal from the substrate 104 or another source (e.g., metal-solvent catalyst mixed with the diamond particles) liquefies and infiltrates into the mass of diamond particles 302 and sinters the diamond particles together to form a PCD table having diamond grains exhibiting diamond-to-diamond bonding (e.g., sp³ bonding) therebetween with the at least one Group VIII metal disposed in the interstitial regions between the diamond grains. In an embodiment, the phosphorous from the at least one material 304 may be enclosed in a protective enclosure made from a material that does not melt during the first stage HPHT process even though phosphorous melts at a relatively low temperature. Thus, in this embodiment, the protective enclosure has a melting temperature or range greater than the at least one Group VIII metal (e.g., cobalt) that is used. Suitable materials for the protective enclosure include, but are not limited to, silicon, iridium, zirconium, molybdenum, tungsten, tungsten carbide, niobium, tantalum, titanium, another refractory material, or alloys of one or more of the foregoing. For example, if the substrate 104 is a cobalt-cemented tungsten carbide substrate, cobalt from the substrate 104 may be liquefied and infiltrate the mass of diamond particles 302 to catalyze formation of the PCD table. Then, the temperature of the second stage HPHT process may be increased (e.g., to about 1850 to about 1900° C.) to diffuse phosphorous into the at least one Group VIII metal while the at least one Group VIII metal is liquified. Optionally, the protective enclosure may be melted or at least softened to promote diffusion of the phosphorous into the at least one Group VIII metal. For example, at atmospheric pressure, white phosphorous melts around 44.2° C., black phosphorous melts around 610° C., and red phosphorous melts around 621° C. Red phosphorous is amorphous, and black phosphorous may be formed by heating white or red phosphorous at high pressure. Amorphous red phosphorous tends to remain amorphous after exposure to about 5.2 GPa. The inventors currently believe that red phosphorous changes to orthorhombic crystal structure after HPHT processing, which is the typical crystal structure for black phosphorous. The inventors also currently believe that amorphous red phosphorous changes orthorhombic black phosphorous before reaction with cobalt to form $Co_2P$.

After sintering the diamond particles to form the PCD table in the first stage HPHT process, in the second stage HPHT process, the temperature is increased from the temperature employed in the first stage HPHT process, while still maintaining application of the same, less, or higher cell pressure to maintain diamond-stable conditions. The temperature of the second stage HPHT process may optionally be chosen to partially or completely diffuse and/or melt the protective enclosure and the at least one material 304 including the phosphorous therein into the at least one Group VIII metal, which then alloys with at least some of the at least one Group VIII metal interstitially disposed in the PCD table and forms the final PCD table 102 having the alloy disposed interstitially between at least some of the diamond grains. Optionally, the temperature of the second stage HPHT process may be controlled so that the at least one Group VIII metal is still liquid or partially liquid so that the alloying with the phosphorous occurs when it is in the liquid phase, which may speed diffusion of the phosphorous into the at least one Group VIII metal. However, in some embodiments, diffusion may occur via solid state and/or liquid diffusion, without limitation.

Before or after alloying, the PDC may be subjected to finishing processing to, for example, chamfer the PCD table, form a desired outer diameter or other lateral dimension (e.g., centerless grinding), planarize the upper surface thereof, or combinations thereof. The temperature of the second stage HPHT process may be about 1500° C. to about 1900° C., and the temperature of the first stage HPHT process may be about 1350° C. to about 1450° C. After and/or during cooling from the second stage HPHT process, the PCD table 102 bonds to the substrate 104. As discussed above, the alloying of the at least one Group VIII metal with the phosphorous may lower a melting temperature of the at least one Group VIII metal and may lower at least one of a bulk modulus or coefficient of thermal expansion of the at least one Group VIII metal.

Figure 3B:
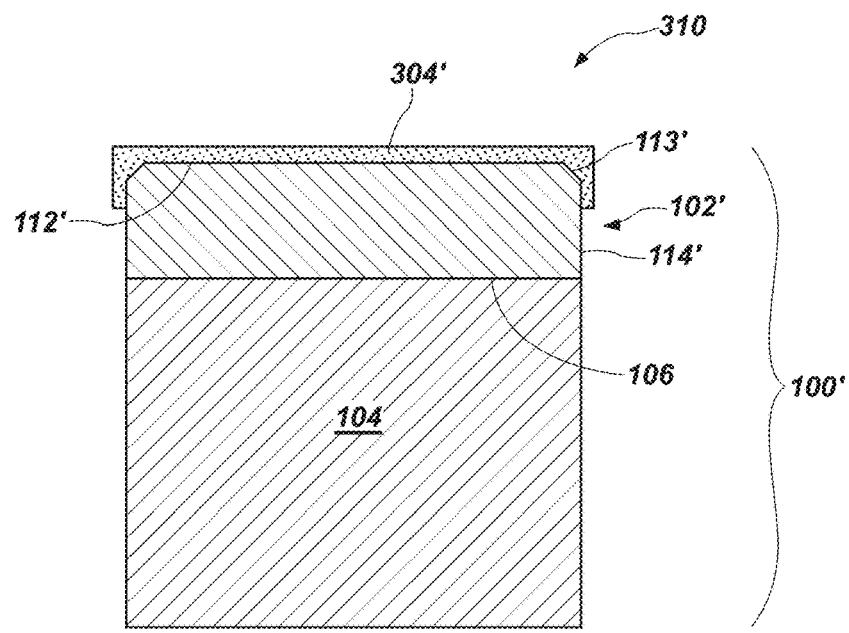
FIGS. 3B-3E are cross-sectional views of a precursor PDC assembly during the fabrication of the PDC shown in FIGS. 1A and 1B according to other embodiments of method.

FIG. 3B is a cross-sectional view of a precursor PDC assembly 310 during the fabrication of the PDC 100 shown in FIGS. 1A and 1B according to another embodiment of a method. In this method, a precursor PDC 100' is provided that has already been fabricated and includes a PCD table 102' integrally formed with substrate 104. For example, the precursor PDC 100' may be fabricated using the same HPHT process conditions as the first stage HPHT process discussed above. Additionally, details about fabricating a precursor PDC 100' according to known techniques is disclosed in U.S. Pat. No. 7,866,418, the disclosure of which was previously incorporated by reference. Thus, the PCD table 102' includes bonded diamond grains exhibiting diamond-to-diamond bonding (e.g., $sp^3$ bonding) therebetween, with at least one Group VIII metal (e.g., cobalt) disposed interstitially between the bonded diamond grains.

At least one material 304' including one or more of any type of phosphorous disclosed herein may be positioned adjacent to an upper surface 112' and chamber 113' of the PCD table 102' to form the precursor PDC assembly 310. For example, the at least one material 304' may be in the form of particles of phosphorous, a thin disc of phosphorous, a green body of particles of phosphorous, at least Group VIII-phosphorous alloy (e.g., a Co—P alloy) or combinations thereof. The precursor PDC assembly 310 may be subjected to an HPHT process using the same or similar HPHT conditions as the second stage HPHT process discussed above or even lower temperatures. During the second stage HPHT process, the phosphorous at least partially or completely melts and/or diffuses to alloy with the at least one Group VIII metal of the PCD table 102' which may or may not be liquid or partially liquid depending on the temperature and pressure.

The temperature of the second stage HPHT process is chosen to promote diffusion and/or alloying of the phosphorous into the PCD table 102' to a selected depth measured from the upper surface 112', such as at least 250 µm, at least about 250 µm, about 400 µm to about 700 µm, or about 600 µm to about 800 µm. For example, the pressure of the second stage HPHT process may be about 5.2 GPa to about 6.5 GPa and the temperature of the second stage HPHT process may be about 1380° C. to about 1900° C., and the temperature of the first stage HPHT process may be about 1350° C. to about 1450° C. For example, in an embodiment, the pressure of the second stage HPHT process may be about 5.2 GPa to about 6.5 GPa (e.g., 5 GPa to about 5.5 GPa) and the temperature of the second stage HPHT process may be about 1000° C. to about 1500° C. (e.g., 1380° C. to about 1500, or about 1400° C.), and the pressure of the first stage HPHT process may be about 7.5 GPa to about 8.5 GPa and the temperature of the first stage HPHT process may be about 1370° C. to about 1430° C. (e.g., about 1400° C.). For example, the pressure of the second stage HPHT process may be lower than that of the first stage HPHT process, which may help prevent damage to the PCD table 102' during the second stage HPHT process.

When two distinct regions are formed in the PCD table 102, HPHT processing the precursor PDC assembly 310 may result in forming the PCD table 102 having the configuration shown in FIG. 1C in which the first region 115 contours the upper surface 112 and the chamfer 113.

Figure 3C:
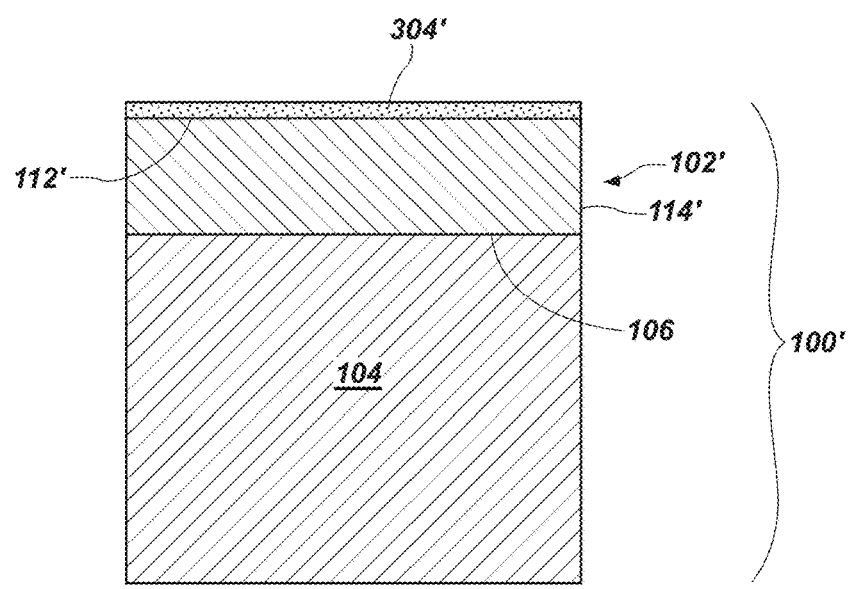

Although the PCD table 102' is illustrated in FIG. 3B as being chamfered with the chamfer 113' extending between the upper surface 112' and at least one side surface 114', in some embodiments as shown in FIG. 3C, the PCD table 102' may not have a chamfer. HPHT processing the precursor PDC assembly shown in FIG. 3C may result in forming the PCD table 102 having the configuration shown in FIG. 1D in which the first region 115 is partially defined by the general horizontal boundary 125. In such an embodiment, the PDC may be formed to exhibit an oversized outer diameter or other lateral dimension, which may be reduced by grinding (e.g., centerless grinding) or other material removal process after HPHT processing.

Figure 3D:
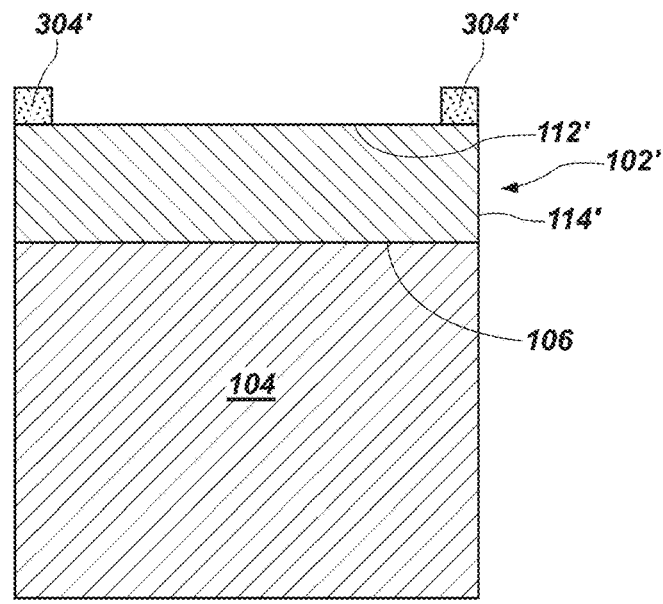
Figure 3E:
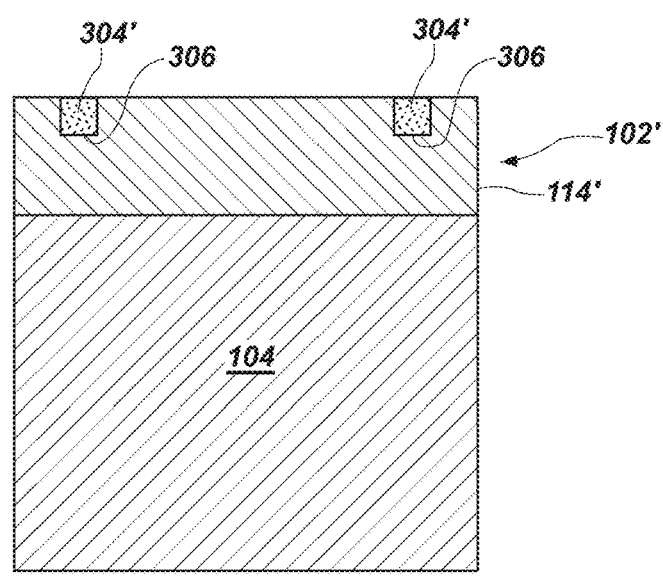
Figure 3F:
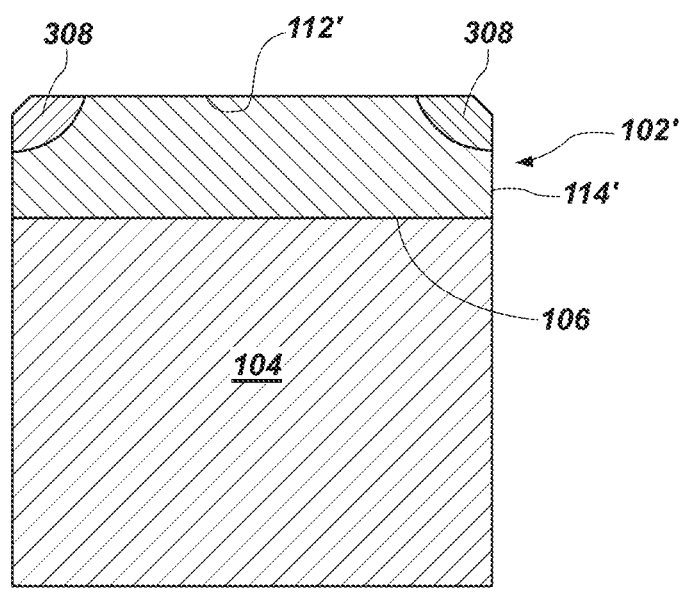
FIG. 3F is a cross-sectional view of an embodiment of a PDC after processing the precursor PDC assembly shown in FIG. 3E.

Referring to FIG. 3D, in another embodiment, the at least one material 304' may be in the form of an annular body so that the phosphorous diffuses into the at least one Group VIII metal in selected location(s) of the PCD table 102'. FIG. 3E illustrates another embodiment for diffusing the phosphorous into the at least one Group VIII metal in selected location(s) of the PCD table 102'. For example, one or more grooves 306 may be machined in the PCD table 102' such as by laser machining. The at least one material 304' may be preplaced in the one or more grooves 306. FIG. 3F illustrates the resultant structure of the PCD table 102' after HPHT processing the structure shown in FIG. 3E in which phosphorous of the at least one material 304' diffuses into the PCD table 102' to form peripheral region 308 in which the at least one Group VIII metal thereof is alloyed with the phosphorous.

It should be noted that in other embodiments, the phosphorous may be mixed with the diamond particles in powder form prior to sintering the diamond particles. For example, phosphorous powder having an average particle size of about 1 µm to about 7 µm may be mixed with the diamond particles in addition to or as an alternative to employing the at least one material 304 and 304'.

Figure 4:
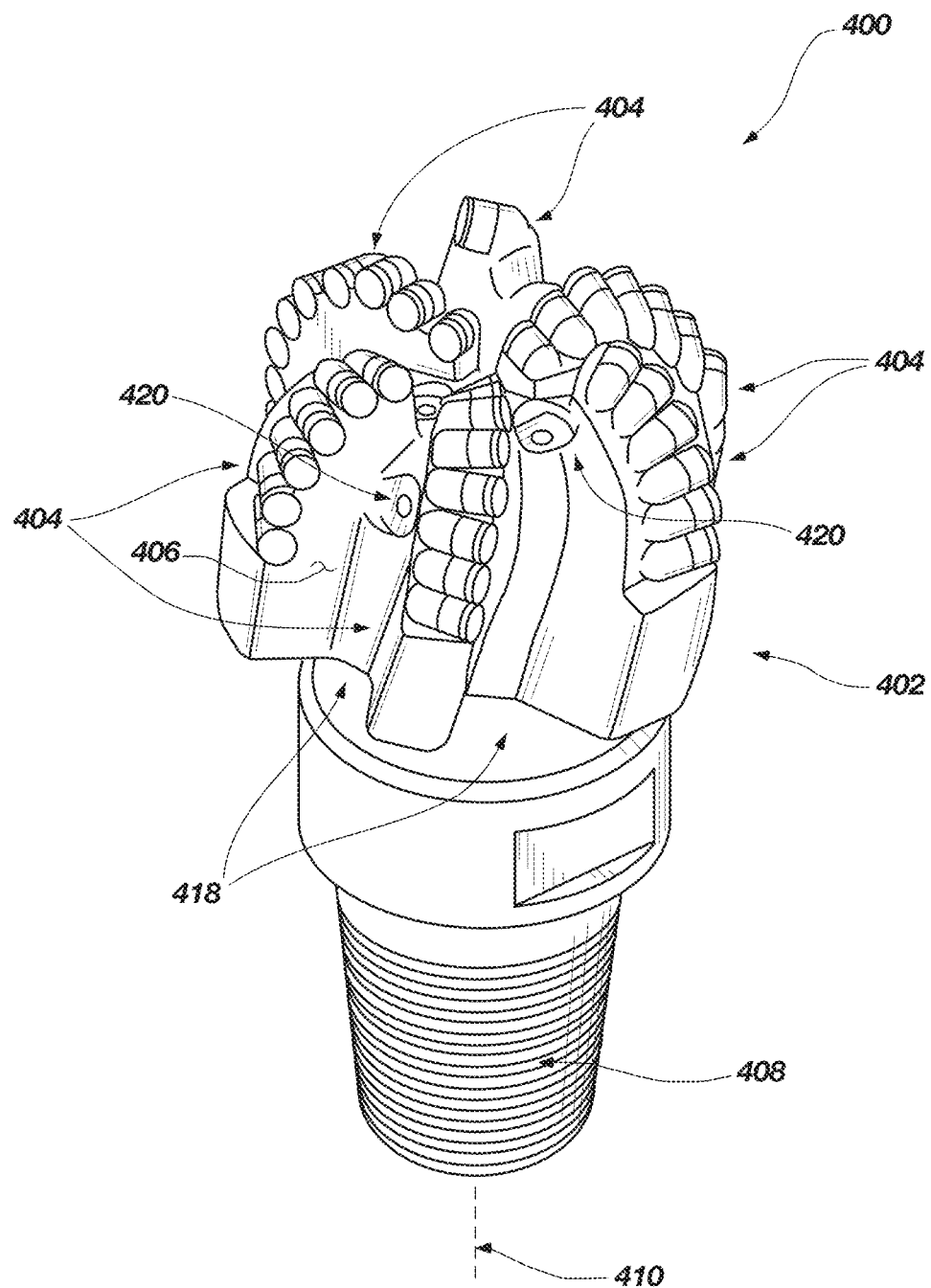
FIG. 4 is an isometric view of an embodiment of a rotary drill bit that may employ one or more of the disclosed PDC embodiments.
Figure 5:
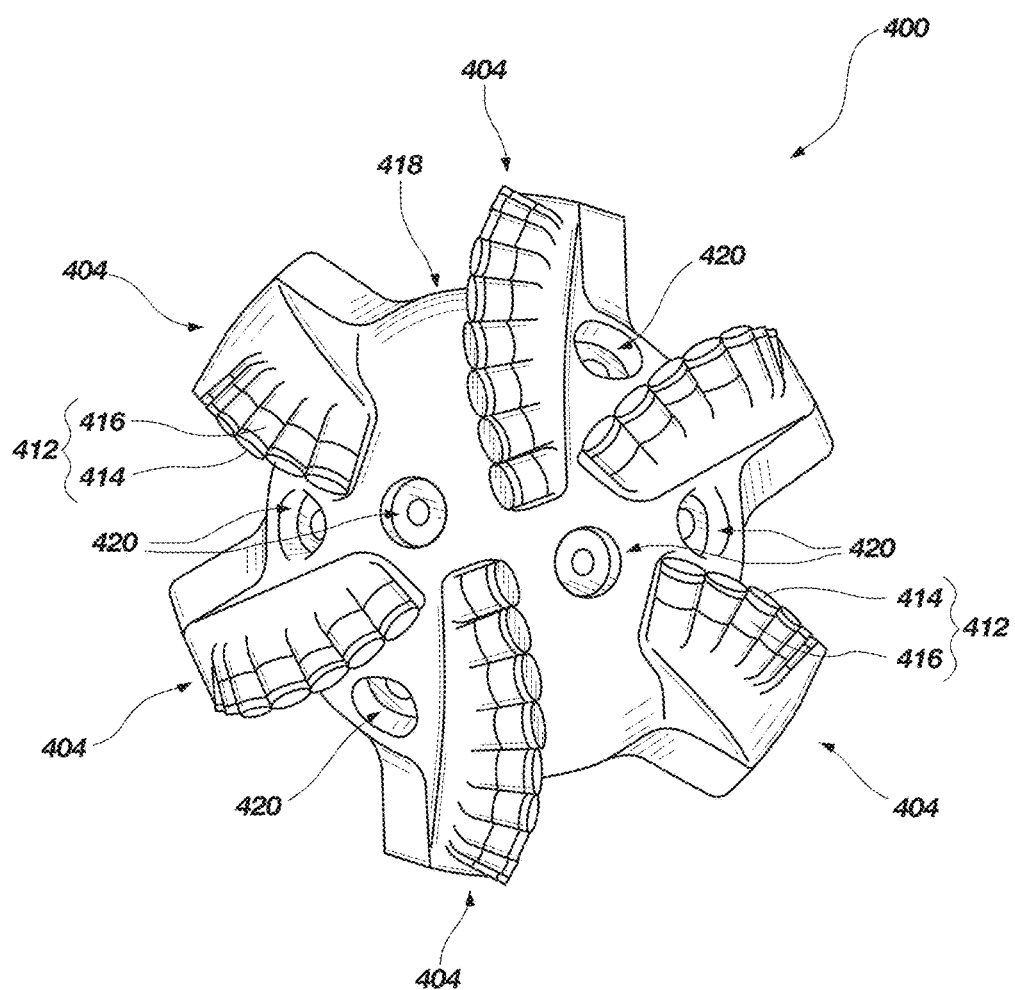
FIG. 5 is a top elevation view of the rotary drill bit shown in FIG. 4.

FIG. 4 is an isometric view and FIG. 5 is a top elevation view of an embodiment of a rotary drill bit 400 that includes at least one PDC configured according to any of the disclosed PDC embodiments. The rotary drill bit 400 comprises a bit body 402 that includes radially and longitudinally extending blades 404 having leading faces 406, and a threaded pin connection 408 for connecting the bit body 402 to a drilling string. The bit body 402 defines a leading end structure for drilling into a subterranean formation by rotation about a longitudinal axis 410 and application of weight-on-bit. At least one PDC, configured according to any of the disclosed PDC embodiments, may be affixed to the bit body 402. With reference to FIG. 5, each of a plurality of PDCs 412 is secured to the blades 404 of the bit body 402 (FIG. 4). For example, each PDC 412 may include a PCD table 414 bonded to a substrate 416. More generally, the PDCs 412 may comprise any PDC disclosed herein, without limitation. In addition, if desired, in some embodiments, a number of the PDCs 412 may be conventional in construction. Also, circumferentially adjacent blades 404 define so-called junk slots 420 therebetween. Additionally, the rotary drill bit 400 includes a plurality of nozzle cavities 418 for communicating drilling fluid from the interior of the rotary drill bit 400 to the PDCs 412.

FIGS. 4 and 5 merely depict one embodiment of a rotary drill bit that employs at least one PDC fabricated and structured in accordance with the disclosed embodiments, without limitation. The rotary drill bit 700 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 100 of FIGS. 1A and 1B) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., PDC 100 of FIGS. 1A and 1B) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing PDCs disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

WORKING EXAMPLES

The following working examples provide further detail in connection with the specific embodiments described above. Comparative working examples 1 and 2 are compared with working example 3 fabricated according to an embodiment of the invention.

Comparative Working Example 1

Several PDCs were formed according to the following process. A first layer of diamond particles having an average particle size of about 19 µm was disposed on a cobalt-cemented tungsten carbide substrate. The diamond particles and the cobalt-cemented tungsten carbide substrate were HPHT processed in a high-pressure cubic press at a temperature of about 1400° C. and a cell pressure of at least 7.7 GPa to form a PDC comprising a PCD table integrally formed and bonded to the cobalt-cemented tungsten carbide substrate. Cobalt infiltrated from the cobalt-cemented tungsten carbide substrate occupied interstitial regions between bonded diamond grains of the PCD table. The PCD table of the PDC was chamfered.

Comparative Working Example 2

Several PDCs were formed according to the process of comparative working example 1 except the cell pressure of the HPHT process was about 5.5 to about 6.0 GPa. The PCD table was then leached in an acid to substantially remove cobalt therefrom to a depth of greater than 250 µm from an upper surface of the PCD table. The PCD table of the PDC was chamfered to the same nominal dimensions as working example 1.

Working Example 3

Several PDCs were formed according to the process of comparative working example 1. Each PDC was then placed in a canister with 3 grams of amorphous red phosphorous powder positioned at the bottom of the canister and adjacent to an upper surface and side surface of the PCD table. The canister and the contents therein were subjected to a second HPHT process at a cell pressure of about 5.5 to about 6 GPa and a temperature of about 1400° C. for about 30 minutes to alloy the cobalt in the PCD table with phosphorous. The alloyed PCD table was not leached. The PCD table of the PDC was chamfered to the same dimensions as working example 1.

Figure 8:
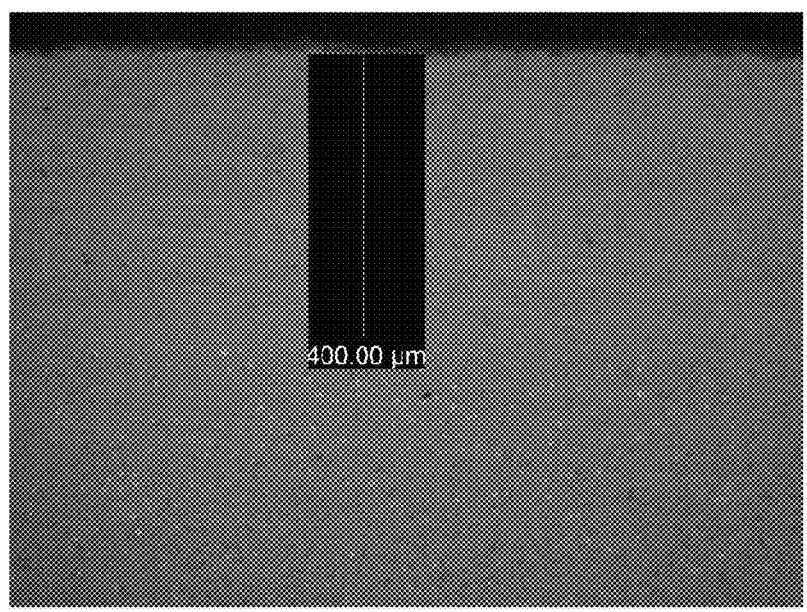
FIG. 8 is an optical photomicrograph of a PCD table of one of the PDCs of working example 3.

One of the PDCs was analyzed using x-ray diffraction ("XRD") to determine the phases present in the alloy disposed in the interstitial regions of the PCD table at an upper surface thereof. XRD indicated that there was mostly $Co_2P$ along with very small amounts of cobalt and tungsten carbide ("WC"). As shown in FIG. 8, optical microscopy indicated that phosphorous diffused into the PCD table about 400 µm to form $Co_2P$. As shown in FIG. 8, in the region adjacent to the phosphorous-diffused region, it is believed that cobalt was present in the form of elemental cobalt as shown by the bright spots in the alloy disposed in the interstitial regions of the PCD table. It should be noted that when the temperature of the second HPHT process was 1200° C. and 1300° C., the phosphorous diffusion depth was very limited at about 25 µm and 30 µm, respectively.

Thermal Stability and Wear Resistance Testing

Figure 6:
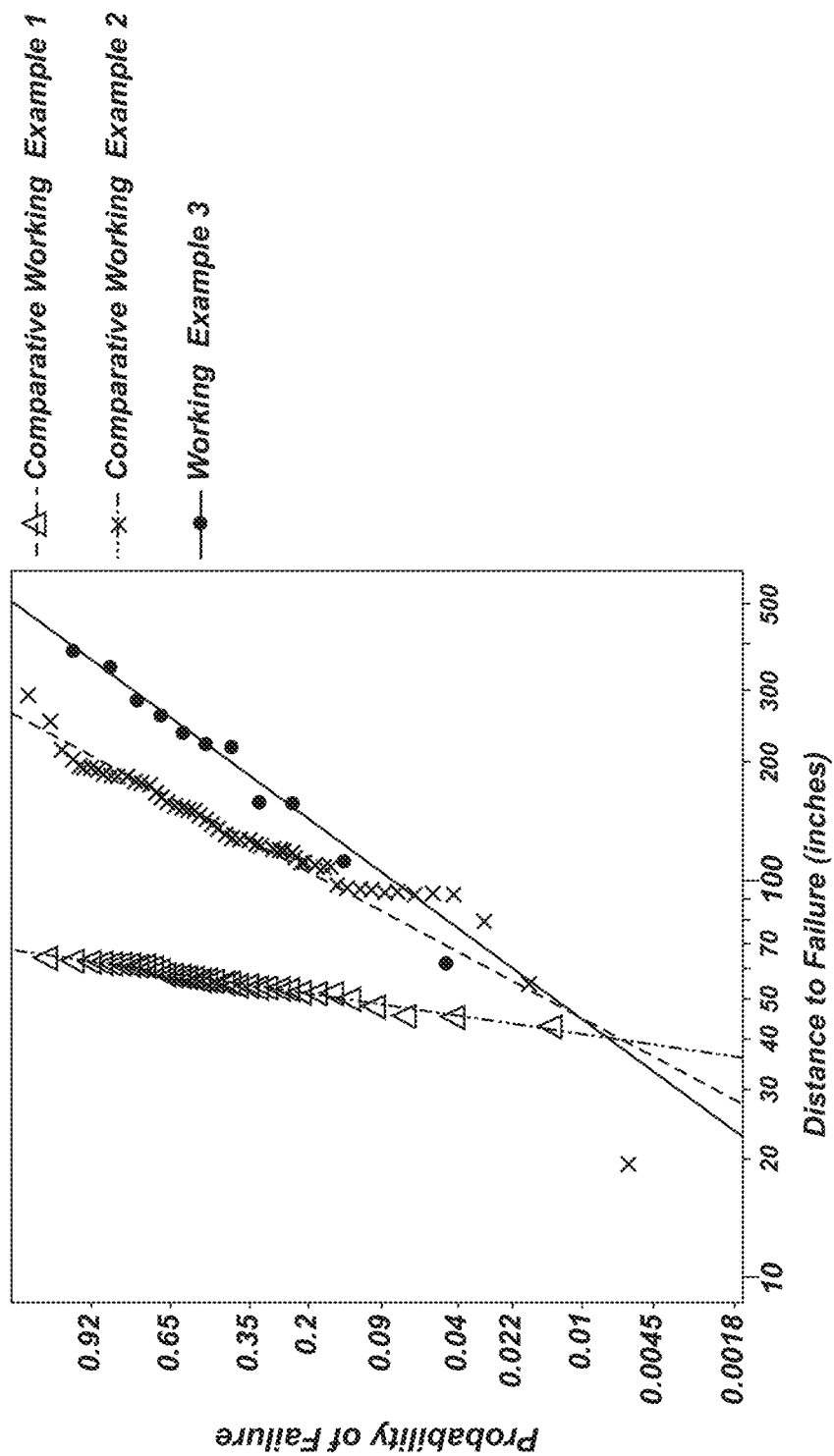
FIG. 6 is a graph of probability of failure of a PDC versus distance to failure for the PDC.

Thermal stability testing was performed on the PDCs of working examples 1-3. FIG. 6 is a graph of probability to failure of a PDC versus distance to failure for the PDC. The results of the thermal stability testing are shown in FIG. 6. FIG. 6 compared the thermal stability of comparative working examples 1 and 2 with working example 3 of the invention. The thermal stability was evaluated in a mill test in which a PDC is used to cut a Barre granite workpiece without any coolant (i.e., dry cutting of the Barre granite workpiece in air). The test parameters used were a back rake angle for the PDC of about 20°, an in-feed for the PDC of about 50.8 cm/min, a width of cut for the PDC of about 7.62 cm, a depth of cut for the PDC of about 0.762 mm, a rotary speed of the workpiece to be cut of about 3000 RPM, and an indexing in the Y direction across the workpiece of about 7.62 cm and about 20 seconds between cutting passes with the PDC on the Bane granite workpiece. The PDC may be held in a cutting tool holder, with the cobalt-cemented tungsten carbide substrate of the PDC tested thermally insulated on its back side via an alumina disk and along its circumference by a plurality of zirconia pins. Failure is considered when the PDC can no longer cut the workpiece.

As shown in FIG. 6, working example 3, which was unleached, exhibited a greater thermal stability than even the deep leached PDC of comparative working example 2. The mean distance to failure in the mill test was 56.37 inches, 143.0 inches, and 217.3 inches for working examples 1, 2, and 3, respectively. The 95% mean confidence interval was 54.74-58.06 inches, 133.4-153.3 inches, and 167.4-282.9 inches for working examples 1, 2, and 3, respectively. Thus, the mill testing indicated that working example 3 exhibited significantly better thermal stability than either comparative working examples 1 and 2 despite the PCD table thereof not having been leached.

Figure 7A:
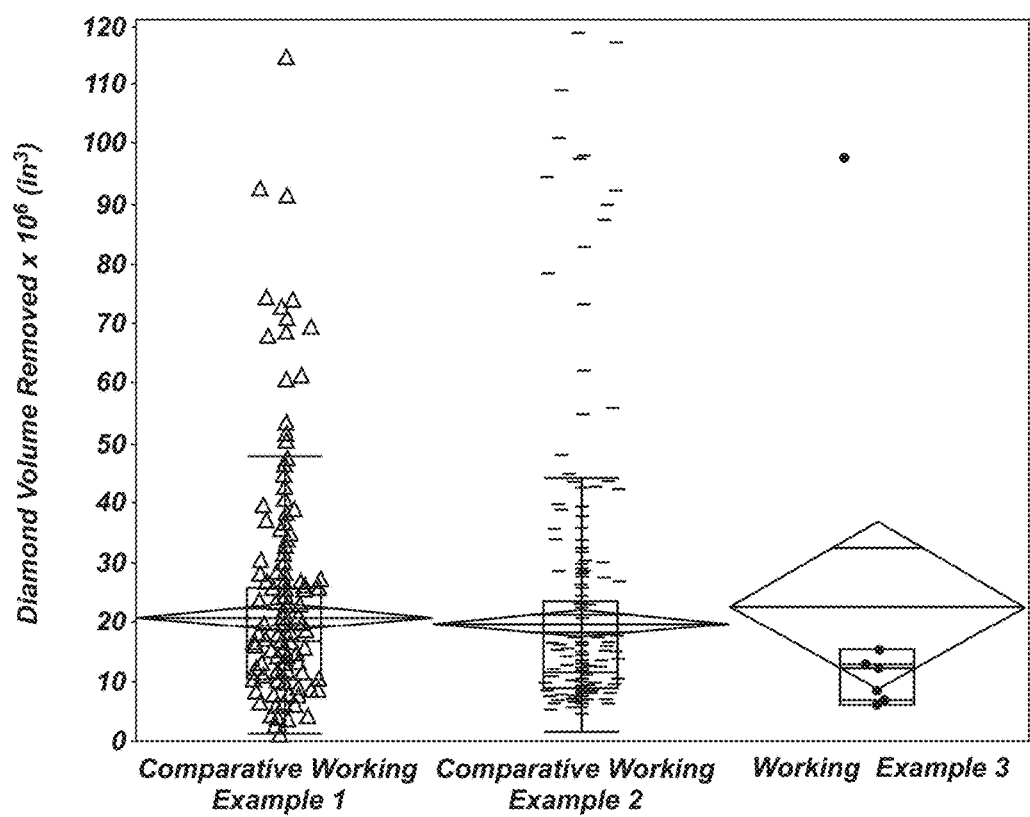
FIGS. 7A and 7B are graphs of diamond volume removed from the PCD tables of working examples 1-3 at 50 and 100 passes, respectively.
Figure 7B:
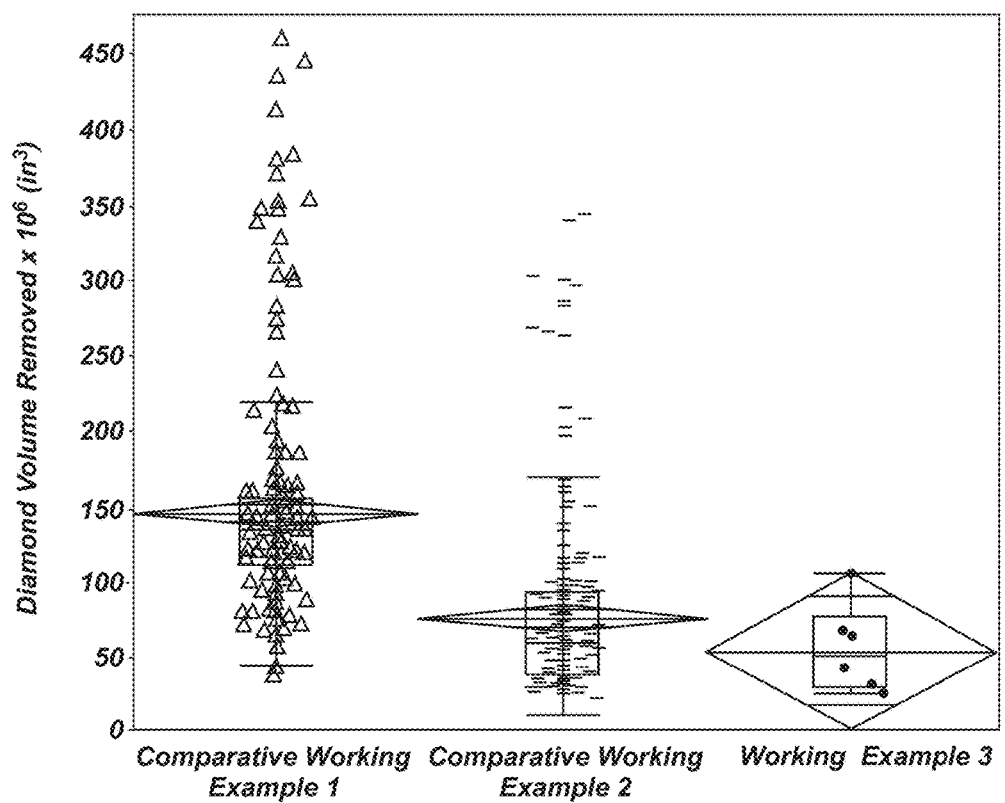

Wear resistance testing was also performed on working examples 1-3 using a vertical turret lathe ("VTL") test by measuring the volume of diamond removed from the PCD tables of working examples 1-3 and the volume of Barre granite workpiece removed after 50 and 100 passes, while the workpiece was cooled with water. The volume of Barre granite removed for 50 passes is about 470 $in^3$ and for 100 passes is about 940 $in^3$. FIGS. 7A and 7B are graphs of diamond volume removed from the PCD tables of working examples 1-3 at 50 and 100 passes, respectively. The test parameters used were a depth of cut for the PDC of about 0.254 mm, a back rake angle for the PDC of about 20 degrees, an in-feed for the PDC of about 6.35 mm/rev, and a rotary speed of the work piece to be cut of about 101 RPM. As shown in FIGS. 7A and 7B, the wear resistance of the PDC of working example 3 was slightly less or even better than the PDCs of comparative working examples 1 and 2 despite the PCD table thereof not having been leached. The table below presents the VTL data in tabular form for completeness.

| | Number of Passes on Wet VTL Test | Mean Diamond Volume Removed × $10^6$ ($in^3$) | 95% Mean Confidence Interval Diamond Volume Removed × $10^6$ ($in^3$) | Number of Samples Tested |
|---|---|---|---|---|
| comparative working example 1 | 50 | 20.51 | 18.62-22.40 | 288 |
| comparative working example 2 | 50 | 19.67 | 17.2-22.09 | 277 |
| working example 3 | 50 | 22.87 | 0-53.6 | 7 |
| comparative working example 1 | 100 | 144.5 | 136.7-152.3 | 286 |
| comparative working example 2 | 100 | 75.54 | 68.5-82.59 | 275 |
| working example 3 | 100 | 54.39 | 22.35-86.43 | 6 |

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A rotary drill bit, comprising:
   a bit body configured to engage a subterranean formation; and
   a plurality of polycrystalline diamond cutting elements affixed to the bit body, at least one of the plurality of polycrystalline diamond cutting elements including:
   a substrate; and
   a polycrystalline diamond table including an upper surface spaced from an interfacial surface that is bonded to the substrate, the polycrystalline diamond table including a plurality of diamond grains defining a plurality of interstitial regions, the polycrystalline diamond table further including:
   a first region extending inwardly from at least a portion of the upper surface, the first region including an alloy disposed in at least a portion of the plurality of interstitial regions of the first region, the alloy comprising at least one intermetallic compounding including at least one Group VIII metal and phosphorous, wherein the at least one intermetallic compound is present in the alloy in an amount of about 80 weight % to about 100 weight %; and
   a second region adjacent to the substrate, the second region being substantially free of the at least one intermetallic compound.

2. The rotary drill bit of claim 1 wherein the phosphorous exhibits a concentration gradient between the upper surface and the interfacial surface of the polycrystalline diamond table.

3. The rotary drill bit of claim 1 wherein the plurality of diamond grains exhibit an average grain size of 30 μm or less, and wherein the alloy is present in the polycrystalline diamond table in an amount of 1 weight % to about 7.5 weight %.

4. The rotary drill bit of claim 1 wherein the alloy consists essentially of the at least one Group VIII metal, the phosphorous, tungsten, and carbon.

5. The rotary drill bit of claim 1 wherein the at least one intermetallic compound is present in the polycrystalline diamond table to a depth of at least about 250 μm as measured from the upper surface.

6. The rotary drill bit of claim 1 wherein the alloy includes substantially only the at least one intermetallic compound.

7. The rotary drill bit of claim 1 wherein the at least one intermetallic compounds includes at least one of $Co_2P$, $Fe_3P$, $Fe_2P$, $Ni_3P$, or $Ni_5P_2$.

8. The rotary drill bit of claim 1 wherein the at least one Group VIII metal includes cobalt, and wherein the at least one intermetallic compound includes at least one cobalt-phosphorous intermetallic compound.

9. The rotary drill bit of claim 1 wherein the at least one intermetallic compound is about 80 weight % to about 95 weight % of the alloy.

10. The rotary drill bit of claim 1 wherein the at least one intermetallic compound is about 90 weight % to about 97 weight % of the alloy.

11. The rotary drill bit of claim 1 wherein the second region includes at least one Group VIII metal disposed in at least a portion of the plurality of interstitial regions thereof.

12. The rotary drill bit of claim 1, wherein the at least a portion of the polycrystalline diamond table exhibits a specific magnetic saturation of about 15 Gauss·$cm^3$/grams or less and a coercivity of about 115 Oersteds to about 250 Oersteds.

13. The rotary drill bit of claim 1 wherein the phosphorous exhibits a concentration gradient between the upper surface and the interfacial surface of the polycrystalline diamond table.

14. The rotary drill bit of claim 1 wherein the alloy consists essentially of the at least one Group VIII metal, the phosphorous, tungsten, and carbon.

15. The rotary drill bit of claim 1 wherein the at least one binary intermetallic compound is present in the polycrystalline diamond table to a depth of at least about 250 μm as measured from the upper surface.

16. The rotary drill bit of claim 1 wherein the at least one binary intermetallic compound includes at least one of $Co_2P$, $Fe_3P$, $Fe_2P$, $Ni_3P$, or $Ni_5P_2$.

17. The rotary drill bit of claim 1 wherein the at least one binary_intermetallic compound is present in the alloy in an amount of about 80 weight % to about 95 weight % of the alloy.

18. The rotary drill bit of claim 1 wherein the at least one binary intermetallic compound is present in the alloy in an amount of about 90 weight % to about 97 weight % of the alloy.

19. A rotary drill bit, comprising:
   a bit body configured to engage a subterranean formation; and a plurality of polycrystalline diamond cutting elements affixed to the bit body, at least one of the plurality of polycrystalline diamond cutting elements including: a substrate; and a polycrystalline diamond table including an upper surface spaced from an interfacial surface that is bonded to the substrate, the polycrystalline diamond table including a plurality of diamond grains defining a plurality of interstitial regions, the polycrystalline diamond table further including:

a first region extending inwardly from at least a portion of the upper surface, the first region including an alloy disposed in at least a portion of the plurality of interstitial regions of the first region, the alloy comprising at least one binary intermetallic compounding including at least one Group VIII metal and phosphorous, wherein the at least one binary intermetallic compound is present in the alloy in an amount of about 80 weight % to about 100 weight %; and;

a second region adjacent to the substrate, the second region being substantially free of the at least one binary intermetallic compound.

20. A rotary drill bit, comprising:
a bit body configured to engage a subterranean formation; and a plurality of polycrystalline diamond cutting elements affixed to the bit body, at least one of the plurality of polycrystalline diamond cutting elements including:
a substrate; and a polycrystalline diamond table including an upper surface spaced from an interfacial surface that is bonded to the substrate, the polycrystalline diamond table including a plurality of diamond grains defining a plurality of interstitial regions, the polycrystalline diamond table further including:

a first region extending inwardly from at least a portion of the upper surface, the first region including an alloy disposed in at least a portion of the plurality of interstitial regions of the first region, the alloy comprising a tungsten carbide phase, a $Co_2P$ cobalt-phosphorous intermetallic compound phase, and a cobalt phase, wherein the phosphorous is present in the alloy in an amount of about 20 atomic % to about 35 atomic %, wherein the at least one $Co_2P$ cobalt-phosphorous intermetallic compound is present in the alloy in an amount greater than about 80 weight %; and a second region adjacent to the substrate, the second region being substantially free of the at least one intermetallic compound.

* * * * *

UNITED STATES PATENT AND TRADEMARK OFFICE
CERTIFICATE OF CORRECTION

PATENT NO. : 10,435,952 B2
APPLICATION NO. : 15/910293
DATED : October 8, 2019
INVENTOR(S) : Mukhopadhyay et al.

It is certified that error appears in the above-identified patent and that said Letters Patent is hereby corrected as shown below:

In the Claims

In Claim 15, Column 16, Line 49, "15. The rotary drill bit of claim 1 wherein the at least one" should read as -- 15. The rotary drill bit of claim 1 wherein the at least one intermetallic compound includes at least one binary intermetallic compound and the at least one --

In Claim 16, Column 16, Line 53, "The rotary drill bit of claim 1 wherein the at least one" should read as -- The rotary drill bit of claim 1 wherein the at least one intermetallic compound includes at least one binary intermetallic compound and the at least one --

In Claim 17, Column 16, Line 56-57, "17. The rotary drill bit of claim 1 wherein the at least one binary_intermetallic" should read as -- 17. The rotary drill bit of claim 1 wherein the at least one intermetallic compound includes at least one binary intermetallic compound and the at least one --

In Claim 18, Column 16, Line 61, "18. The rotary drill bit of claim 1 wherein the at least one" should read as -- 18. The rotary drill bit of claim 1 wherein the at least one intermetallic compound includes at least one binary intermetallic compound and the at least one --

Signed and Sealed this
Third Day of October, 2023

Katherine Kelly Vidal
*Director of the United States Patent and Trademark Office*